(12) United States Patent  
Giallorenzi et al.

(10) Patent No.: US 7,634,033 B1  
(45) Date of Patent: Dec. 15, 2009

(54) SPREAD SPECTRUM DETECTION SYSTEM AND METHOD

(75) Inventors: Thomas R. Giallorenzi, Herriman, UT (US); Johnny M. Harris, Centerville, UT (US); Dan M. Griffin, Bountiful, UT (US); Richard Ertel, Sandy, UT (US); Eric K. Hall, Sandy, UT (US)

(73) Assignee: L-3 Communications, Corp., New York, NY (US)

( * ) Notice: Subject to any disclaimer, the term of this patent is extended or adjusted under 35 U.S.C. 154(b) by 540 days.

(21) Appl. No.: 11/351,464

(22) Filed: Feb. 10, 2006

(51) Int. Cl.  
*H04B 1/10* (2006.01)

(52) U.S. Cl. .................. 375/350; 375/316; 375/346; 375/137; 375/150; 375/147; 375/152; 375/131

(58) Field of Classification Search .......... 375/350, 375/316, 346, 137, 150, 147, 152, 131  
See application file for complete search history.

(56) References Cited

U.S. PATENT DOCUMENTS

| | | | |
|---|---|---|---|
| 4,621,365 A | 11/1986 | Chiu | |
| 5,003,552 A | 3/1991 | Mower | |
| 5,285,472 A | 2/1994 | Leonard et al. | |
| 5,566,202 A | 10/1996 | Lang | |
| 5,774,494 A | 6/1998 | Sawahashi et al. | |
| 6,111,911 A | 8/2000 | Sanderford, Jr. et al. | |
| 6,134,286 A | 10/2000 | Chennakeshu et al. | |
| 6,151,353 A | 11/2000 | Harrison et al. | |
| 6,169,731 B1 | 1/2001 | Stewart et al. | |
| 6,249,539 B1 | 6/2001 | Harms et al. | |
| 6,282,232 B1 | 8/2001 | Fleming, III et al. | |
| 6,323,805 B1 | 11/2001 | Zou et al. | |
| 6,324,227 B1 | 11/2001 | Kang et al. | |
| 6,396,819 B1 | 5/2002 | Fletter et al. | |
| 6,407,699 B1 | 6/2002 | Yang | |
| 6,452,961 B1* | 9/2002 | Van Wechel | 375/142 |
| 2002/0126644 A1* | 9/2002 | Turpin et al. | 370/342 |
| 2003/0227963 A1* | 12/2003 | Dafesh | 375/149 |
| 2004/0184608 A1* | 9/2004 | Mutoh | 380/46 |
| 2004/0247019 A1* | 12/2004 | McDonough et al. | 375/148 |

* cited by examiner

*Primary Examiner*—David C Payne  
*Assistant Examiner*—Zewdu Kassa  
(74) *Attorney, Agent, or Firm*—Kirton & McConkie; William T. Ralston

(57) ABSTRACT

A system and method for detecting a spread spectrum encoded message within a received signal is described. The spread spectrum encoded message has an unknown code phase, unknown code frequency offset, and unknown carrier frequency offset. A plurality of code phase hypotheses, code frequency offset hypotheses, and carrier frequency offset hypotheses are searched in parallel. The unknown code phase, unknown code frequency offset, and unknown carrier frequency offset may also be estimated.

42 Claims, 9 Drawing Sheets

SPREAD SPECTRUM DETECTION SYSTEM AND METHOD

FIELD OF THE INVENTION

The present invention relates generally to the reception of spread spectrum encoded messages which have been encoded with a predetermined pseudonoise code, and more particularly to searching for a spread spectrum encoded message which has an unknown code phase, unknown code frequency offset, and unknown carrier frequency offset.

BACKGROUND

Spread spectrum techniques have proven useful in a variety of communications applications, including cellular telephones, wireless local area networks, and military communications. One advantage provided by spread spectrum techniques is the ability to build a transmitter which is difficult for an unauthorized user to detect.

Wireless spread spectrum systems operate by using a relatively large amount of spectrum bandwidth to communicate their signals. The large bandwidth is consumed by spread spectrum encoding the message data using a pseudonoise code. The two most common types of spread spectrum transmission are frequency hopping, where the pseudonoise code is used to pseudo randomly change the transmission frequency on a periodic basis, and direct sequence, where the pseudonoise code is used to modulate the transmit signal at a high rate relative to the underlying message data.

In order to detect a spread spectrum transmission, it is generally necessary to know the pseudonoise code beforehand. Furthermore, to extract the message data, it is generally necessary to know the timing of the pseudonoise code. For example, in a direct sequence system, this can be accomplished by knowing the code frequency (rate at which the pseudonoise code advances through its sequence) and the starting time of the pseudonoise code (sometimes referred to as the phase of the code). A signal for which the spread spectrum receiver knows the pseudonoise code, pseudonoise code phase, and pseudonoise code frequency can be referred to as a synchronized signal.

One interesting property of spread spectrum systems is that unsynchronized signals appear as noise to a spread spectrum decoder, and are suppressed by the decoder. This property is sometimes used to provide a so-called spread spectrum multiple access system (also known as code division multiple access). For example, different users can be assigned different pseudonoise codes, in which case a receiver will reject signals from users other than the specific user to whose code the receiver is synchronized. As another example, all users can be assigned a common pseudonoise code, but each user transmits with a different pseudonoise code start time. This results in each user having a different pseudonoise code phase. A receiver tuned to the common pseudonoise code at a particular timing (phase) will reject other user with different code timing (phase). This latter example is sometimes referred to as spread-ALOHA.

Achieving synchronization with a spread spectrum signal can be difficult, in part due to high pseudonoise code rate (frequency). For example, a relatively low message data rate of 1,000 bits per second might be spread spectrum encoded with a relatively high pseudonoise code rate of 10,000,000 chips per second, where a bit of the pseudonoise code is referred to as a chip. In this example, the ratio of 10,000,000/ 1,000=10,000 is the processing gain. A spread spectrum receiver for this signal will need to synchronize to the high pseudonoise code rate being used by the transmitter, and hence the spread spectrum receiver requires a factor of 10,000 higher synchronization accuracy than a non spread spectrum system. The difficulty of achieving this synchronization increases as the processing gain increases.

In order to limit the difficulty of synchronizing spread spectrum systems, various techniques have been used. These techniques include the use of very stable oscillators to generate the carrier frequency on which the transmission is centered, the use of very stable clocks to generate the pseudonoise code, and the transmission of special pilot signals or long preambles of known data to aid receiver in synchronization.

Another property of spread spectrum systems is a generally low probability of detection by a user lacking knowledge of the pseudonoise code. This is because the transmitter power of the spread spectrum signal is spread out over a relatively large portion of radio spectrum. By using a high processing gain, it is possible to sufficiently spread the transmitter power out so that the resulting transmission spectral power density is below the noise level within the environment. In general, it is more difficult to detect a spread spectrum signal without knowledge of the pseudonoise code as the processing gain is increased, making the use of high processing gain desirable. Unfortunately, higher processing gains also make acquisition of the spread spectrum signal more difficult for authorized receivers that know the pseudonoise code.

A particular challenge exists in a spread spectrum system which has a large number of transmitters, each of which operates at a relatively low data rate, yet requires a low probability of detection (and hence high processing gain and high pseudonoise code rate). For example, transmitters may be configured to periodically transmit short bursts of message data at a relatively low rate, each transmitter using a common pseudonoise code, yet starting the transmission at a unique starting time. Furthermore, very short preambles may be used, for example to limit power consumption and enhance the low probability of detection. A receiver is faced with a considerable challenge in detecting these short message transmissions which have an unknown start time. Since the message transmissions are short, there is a limited amount of time to detect the message. Traditional approaches which sequentially search a plurality of hypothesized start times can thus prove ineffective at detecting these short transmissions, since the transmission may occur while the searching is being done using a different hypothesized start time than that of the transmission.

The problem just described is further aggravated when the transmitters are designed to achieve very low cost. Hence, the oscillators used may provide relatively low accuracy and stability, resulting in carrier frequency offsets and code frequency offsets. Furthermore, the code frequency offset may be unrelated to the carrier frequency offset due to a combination of different oscillators and Doppler effects. Accordingly, a receiver is faced with a challenging problem of detecting the transmissions.

SUMMARY OF THE INVENTION

It has been recognized that it would be advantageous to develop a system and method for detecting a spread spectrum encoded message within a received signal, wherein the spread spectrum encoded message has been encoded with a predetermined pseudonoise code. The spread spectrum encoded message may thus have an unknown code phase, unknown code frequency offset, and unknown carrier frequency offset.

The invention includes a system for receiving a spread spectrum encoded message. The system includes a receiver, a first searcher, a second searcher, a third searcher, and an estimator. The first, second, and third searchers are coupled to the receiver, and the estimator is coupled to the searchers. The receiver accepts the received signal and outputs a plurality of received signal streams, one to each of the searchers. The first searcher is configured to search the received signal stream at a plurality of code phase hypotheses for the spread spectrum encoded message. Similarly, the second searcher and third searchers are each configured to search a plurality of code frequency offset hypotheses and a plurality of carrier frequency offset hypothesis, respectively. The searchers are configured to perform these searches in parallel to produce a plurality of correlation results, which are provided to the estimator. The estimator estimates the unknown code phase, unknown code frequency, and unknown carrier frequency offset from the correlation results.

Additional features and advantages of the invention will be apparent from the detailed description which follows, taken in conjunction with the accompanying drawings, which together illustrate, by way of example, features of the invention.

DETAILED DESCRIPTION

Figure 1:
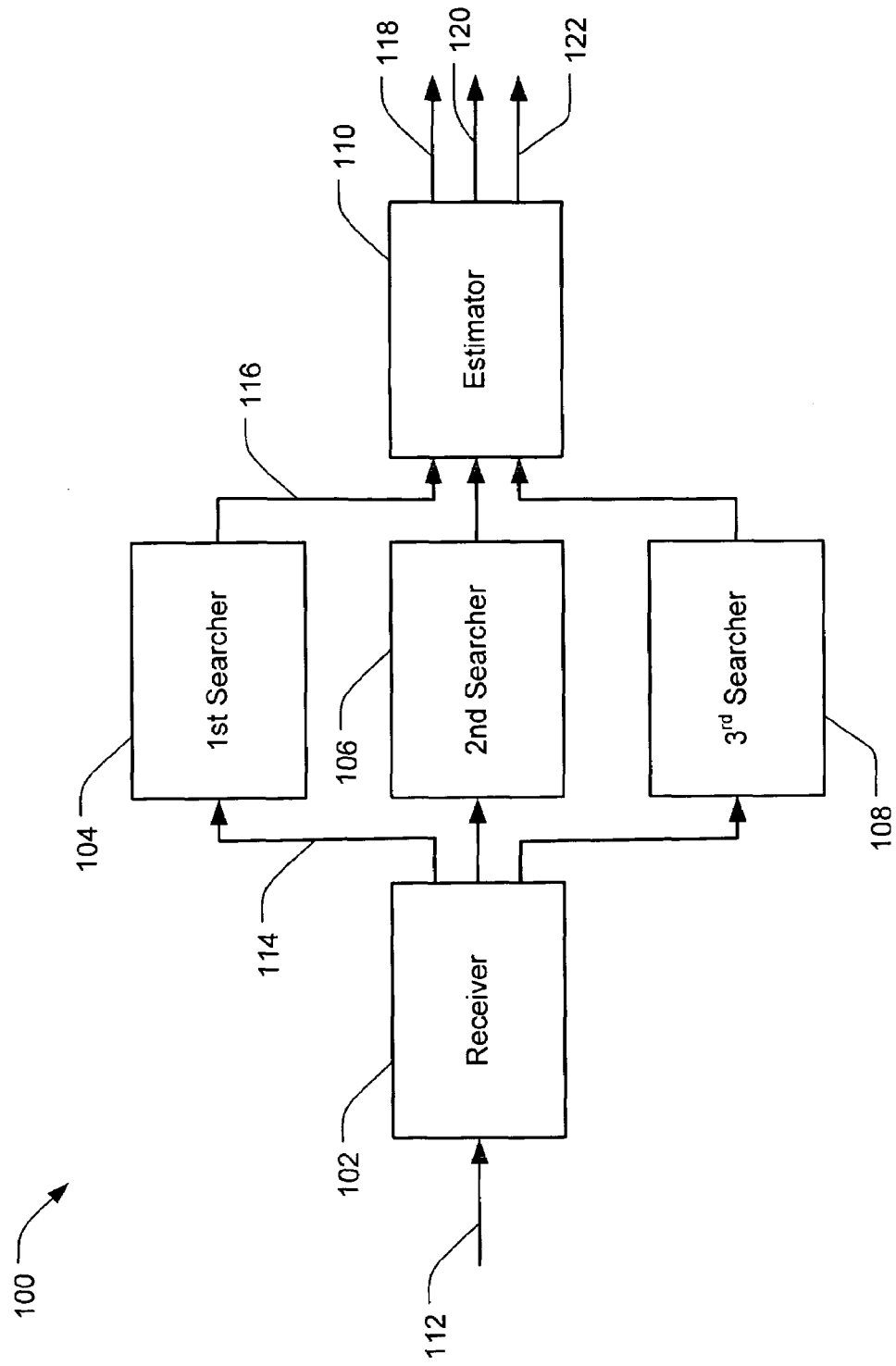
FIG. 1 is a block diagram of a system for detecting a spread spectrum encoded message in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

As illustrated in FIG. 1, a system, indicated generally at 100, in accordance with an embodiment of the present invention, is shown for detecting a spread spectrum encoded message within a received signal. The spread spectrum encoded message has an unknown code phase, unknown code frequency offset, and unknown carrier frequency offset. The term code phase refers the timing of the pseudonoise code. Code phase can be defined relative to various references, including for example a timing clock within the system. Alternately, various other timing references (such as an external timing source) can be used as well. Code phase is thus a function of the start time of the pseudonoise code at the transmitter, starting code phase offset in the transmitter (if the transmitter does not start at the beginning of the code, but starts at some intermediate point), propagation delay between the transmitter and system, and possibly other sources. The term code frequency offset refers to the difference between the rate of the pseudonoise code within the received signal received by the system and a reference code rate. The reference code rate may also be defined with respect to various references, including, for example, a timing clock within the system or an external timing reference. Code frequency offset can therefore result from a variety of sources, including timing reference errors within the transmitter, changing propagation delay between the transmitter and system (e.g. Doppler effect), and timing reference errors within the system. Finally, the term carrier frequency offset refers to the difference between the carrier frequency of the received signal received by the system and a reference carrier frequency. The reference carrier frequency may also be defined with respect to various references, including for example a frequency reference within the system or an external frequency reference. Carrier frequency offset can therefore result from a variety of sources similar to the code frequency offset, including frequency reference errors within the transmitter, changing propagation delay between the transmitter and system (e.g. Doppler effect), and frequency reference errors within the system. In many prior art systems, the code frequency offset and the carrier frequency offset are related, in part because the code frequency and carrier frequency are generated by synthesizers using a common reference. This, however, is not essential, and embodiments of the present invention can accommodate situations where the code frequency offset and carrier frequency offset are unrelated to each other.

The received signal 112 is accepted by a means for receiving, such as a receiver 102, which outputs a plurality of received signal streams 114. For example, the receiver may accept the received signal in a baseband or intermediate frequency form, and provide buffering and amplification of the signal. Alternately, the receiver may accept the received signal in a digitized form, and distribute the digitized samples to the received signal streams. As another example, in a wireless communications system, the receiver may include an antenna to capture the received signal and a downconverter to convert the received signal from a radio frequency to an intermediate or baseband frequency.

The plurality of received signal streams 114 are provided to a first searcher 104, second searcher 106, and third searcher 108. These searchers are configured to search, in parallel, a plurality of code phase hypotheses, code frequency offset hypotheses, and carrier frequency offset hypotheses to produce a plurality of correlation results 116. In particular, the first searcher searches the code phase hypotheses for the spread spectrum encoded message, the second searcher searches the code frequency offset hypotheses, and the third searcher searches the carrier frequency offset hypotheses. The searchers therefore cooperate to search the plurality of combined code phase hypotheses, code frequency offset hypotheses, and carrier frequency offset hypotheses. As will occur to one of skill in the art, the searches can be coordinated, to ensure a desired range of code phase, code frequency offset, and carrier frequency offset hypotheses are searched. Various ways of selecting the hypotheses to be searched can be used as will be discussed further below. As a further detailed example, parallel searching can be accomplished by a plurality of sliding correlators, each correlator searching a plurality of code phase and each correlator corresponding to a specific code frequency offset and carrier frequency offset.

In contrast to previously known spread spectrum searchers which perform a serial search of multiple hypotheses, the system 100 can provide a faster acquisition time because searching for different hypotheses occurs at least partially simultaneously. For example, testing for the presence of a message at one combination of code phase, code frequency offset hypotheses can occur simultaneously with testing the same code phase and different code frequency offset and carrier frequency offsets. Furthermore, a fine grained search may be performed by testing a number of code phase, code frequency offset, and carrier frequency offset hypothesis which are closely spaced so as to minimize mismatch loss during the correlation. Consequently, a shorter preamble can be used without reducing the detection probability. This tends to provide increased communication efficiency, as less time is wasted transmitting preambles, which carry no user information, and more time is used transmitting user information.

As is known and discussed in the background section above, to properly extract a spread spectrum encoded message, it is generally necessary to synchronize to the code phase. However, a code frequency offset between the received signal and a local reference used by the system can result in a loss of synchronization due to the code phase advancing at a different rate between the received signal and the local reference. In other words, the code phase will be changing at a rate proportional to the amount of code frequency offset. Hence, depending on the code frequency offset, any particular code phase hypothesis may be valid for only a short interval of time. This results in a tradeoff: longer correlation integration time provides a potentially higher signal to noise ratio (and thus higher detection probability), but longer correlation integration time also provides a loss in signal to noise ratio due to code phase drift (and thus lower detection probability). Consequently, prior art searchers have typically limited the amount of time any particular code phase hypothesis has been examined, for example by limiting the integration time of a correlator used as a searcher. Unfortunately, limiting the integration time reduces the performance of the searcher in reliably detecting the presence of the message. The system 100 helps to avoid this tradeoff by using a plurality of code frequency hypotheses. For a code frequency hypothesis close to the unknown code frequency offset, the code phase will vary slowly, allowing the code phase hypothesis close to the unknown code phase to remain valid for a longer period of time. The system thus permits, for example, longer integration to be performed, providing increased detection probability relative to prior art systems which do not search different code frequency hypotheses.

Finally, to complete the description of the system 100, an estimator 110 is coupled to the first searcher 104, second searcher 106, and third searcher 108 and accepts the plurality of correlation results 116. Each of the correlation results corresponds to a unique code phase hypothesis, unique code frequency offset hypothesis, and unique carrier frequency offset hypothesis. The estimator estimates the unknown code phase, unknown code frequency offset, and unknown carrier frequency offset (hereinafter referred to as signal parameters) of the spread spectrum encoded message. For example, the estimator may estimate the signal parameters by setting the signal parameters equal to the code phase hypothesis, code frequency offset hypothesis, and carrier frequency offset hypothesis corresponding to a maximum correlation result. Alternately, the estimator may perform an interpolation between two, three, or more of the correlation results as discussed in further detail below. The estimated signal parameters (estimated code phase 118, estimated code frequency offset 120, estimate carrier frequency offset 122) may be output from the estimator for use in extracting the data from the message, for example using a demodulator. Further detail on alternative implementations of the estimator is provided below.

Figure 2:
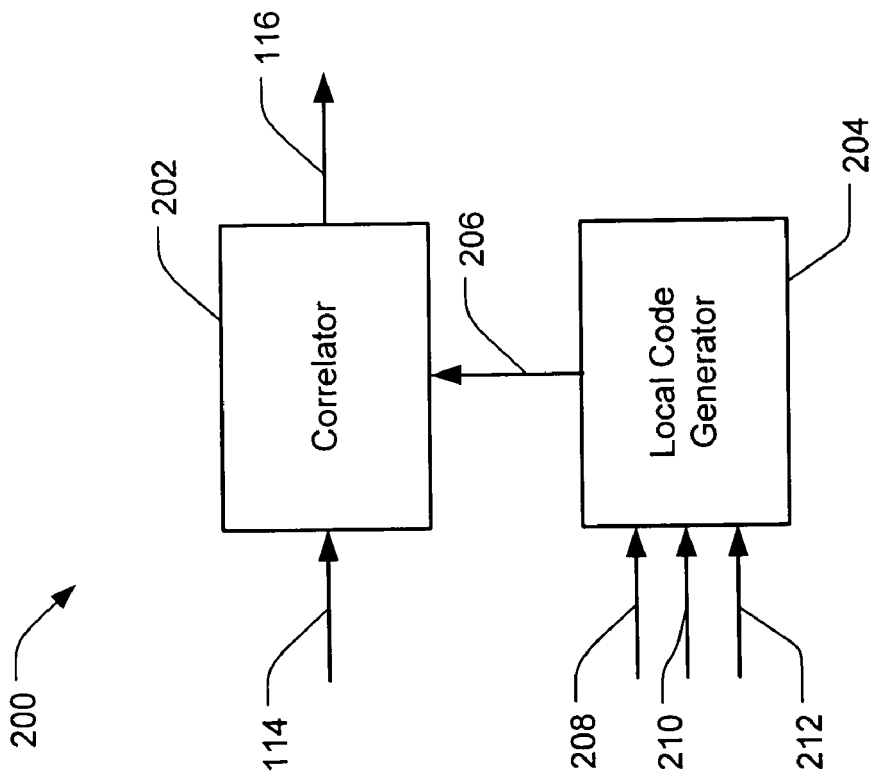
FIG. 2 is a block diagram of the searcher of FIG. 1, in accordance with an embodiment of the present invention.

Turning attention to the searchers in further detail, each searcher may be configured as shown in FIG. 2, in accordance with an embodiment of the present invention. Each searcher 200 includes a correlator 202 configured to correlate the received signal stream 114 with a local code replica 206. The local code replica corresponds to the predetermined pseudonoise code, generated (e.g., by a local code generator 204) with a particular code phase hypothesis 208, code frequency offset hypothesis 210, and carrier frequency offset hypothesis 212. The correlators thus function to test for energy in the received signal corresponding to a particular set of signal parameters. The estimator 110 (FIG. 1) may declare detection of the spread spectrum encoded message when at least one of the plurality of correlation results 116 exceeds a predetermined threshold. Alternately, the estimator may declare detection when at least one of the correlation results exceeds a predetermined multiple of an estimated noise floor.

One exemplary implementation of a correlator suitable for use in embodiments of the present invention is disclosed in commonly owned co-pending U.S. patent application Ser. No. 11/351,465, entitled "Correlation Apparatus and Method for Accommodating Spreading Code Frequency Offset".

Figure 3:
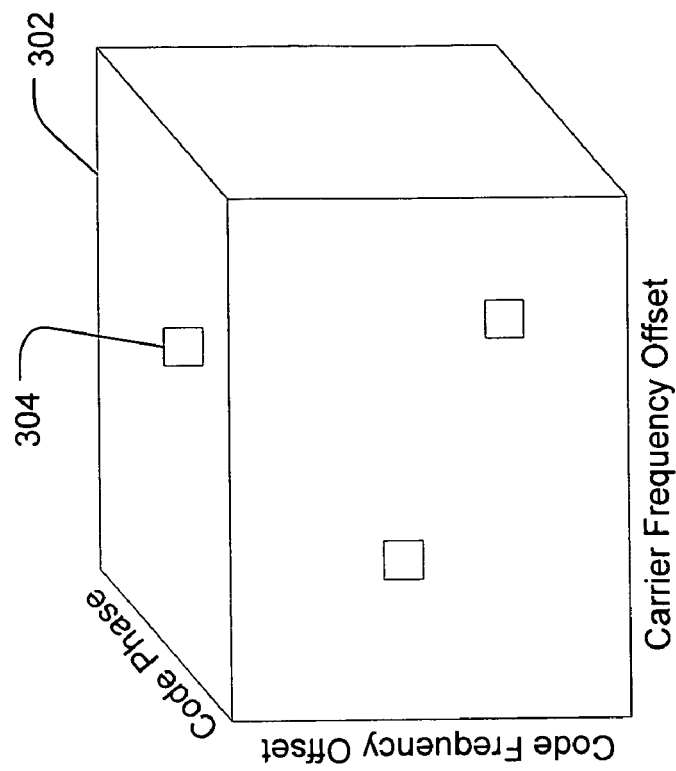
FIG. 3 is an illustration of three dimensional space in unknown code phase, unknown code phase, and unknown carrier frequency offset.

Another advantage provided the system 100 (FIG. 1) is the ability to also detect multiple message transmissions in a spread ALOHA system that overlap partially in time. For example, FIG. 3 provides a conceptual illustration of the search methodology implemented by the system. The unknown code phase, unknown code frequency offset, and unknown carrier frequency offset represent a three dimensional space 302 that is searched for message detections. In particular, the unknown code frequency offset and unknown carrier frequency offset of the spread spectrum encoded message may be independent from each other, unlike some prior art system in which these two signal parameters are proportional (and hence, a two dimensional search can be performed). By "independent" is meant that the code frequency offset and carrier frequency offset may have different causes, for example being generated by synthesizers or referenced to oscillators which are not phase or frequency locked together. To some degree, each point (e.g. 304) in this space represents a potential combination of signal parameters for which a spread spectrum transmission may be received. For example, two spread spectrum encoded message transmissions that have the same code frequency offset and carrier frequency offset, yet differ in code phase by several chips can be separately detected with little interference to each other. In general, it may be possible to simultaneously detect two overlapping spread spectrum encoded messages transmissions having some signal parameters in common and at least one signal parameter different. By searching this space in parallel, the system thus provides the ability to detect multiple overlapping transmissions. The system may also include one or more demodulators, as discussed in further detail below, in order to decode the spread spectrum message.

As mentioned above, various strategies for searching the space are possible. For example, one searcher can directed to searching in code phase, one searcher can be directed to searching in code frequency offset, and one searcher can be directed to searching in carrier frequency offset. For example, a starting point corresponding to a set of signal parameters can be selected, and the searchers can search in three-dimensions from this starting point, each searching exploring a different axis.

As another example, the searchers can be assigned to search a region within this space. For example, the first searcher can search a plurality of code phases at a first assigned code frequency offset hypothesis, then search a second plurality of code phases at a second assigned code frequency offset hypothesis to cover a two dimensional slice within the region. The second searcher and third searcher can similarly search other two-dimensional slices within the region.

As yet another example, the searchers can be coordinated to search a line, curve, curved surface, three-dimensional region, or multiple discontinuous regions within the space by assigning the hypotheses to be searched. As another example, the search strategy can follow a tree approach, starting from a point within the space, and then searching in different dimensions somewhat like branches of a tree. The specific search strategy to be adopted is dependent upon the operational conditions expected, although in general, searching in all three dimensions (code phase, code frequency offset, and carrier frequency offset) can be performed. Discussion of additional detailed embodiments providing specific searching strategies will now be provided.

Figure 7:
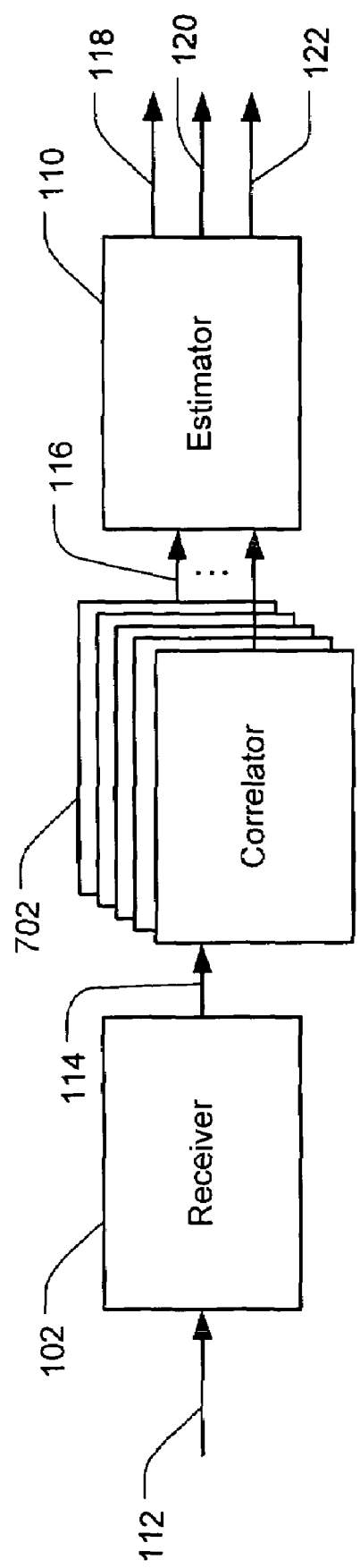
FIG. 7 is a block diagram of a system for detecting a spread spectrum encoded message in accordance with another alternate embodiment of the present invention.

An alternate system for detecting a spread spectrum encoded message within a received signal is shown generally at 700 in FIG. 7 in accordance with an embodiment of the present invention. The spread spectrum encoded message has been encoded with a predetermined pseudonoise code having an unknown code phase and unknown code frequency offset and the spread spectrum message has an unknown carrier frequency offset. The received signal 112 is accepted by a receiver 102, as discussed above. The receiver outputs at least one received signal stream 114. The received signal stream is provided to a means for parallel correlating the received signal stream with a plurality of code phase, code frequency offset, and carrier frequency offset hypotheses to produce a plurality of correlation results. For example, the means for parallel correlating may be implemented with a plurality of correlators 702. The correlators are each configured to correlate the received signal stream with a local code replica to produce a correlation result 116. Each correlator uses a unique set of signal parameters. In other words, for each correlator, at least one of a carrier frequency offset hypothesis, code frequency offset hypothesis, and code phase hypothesis is different than every other correlator. The correlation results are provided to an estimator 110, which estimates the signal parameters, and can output estimated code phase 118, estimated code frequency offset 120, and estimated carrier frequency offset 122.

Figure 8:
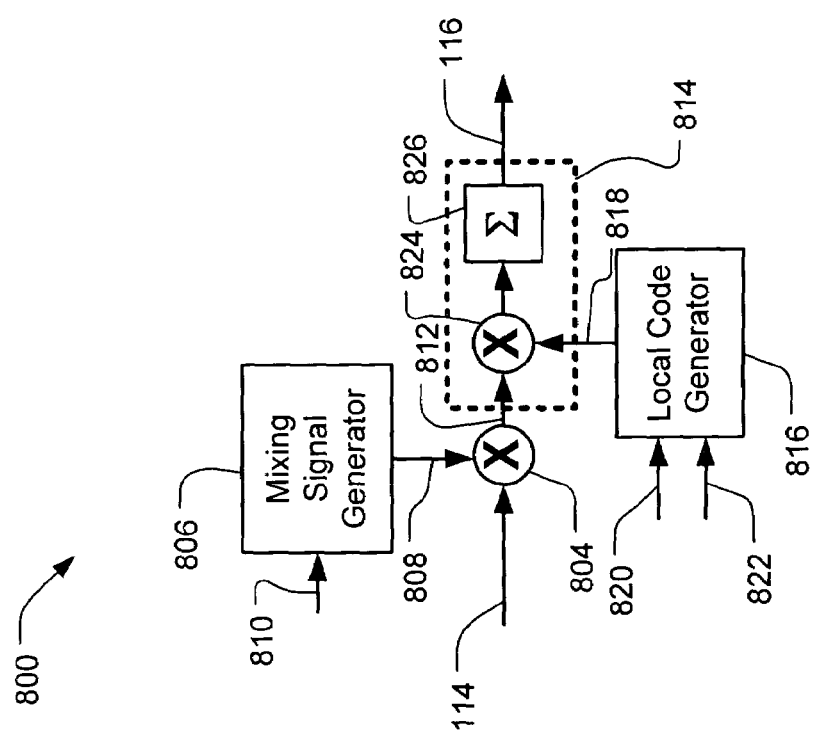
FIG. 8 is a block diagram of a correlator in accordance with an embodiment of the present invention.

Discussing the correlators 702 in further detail, there are various options for implementing the correlators. For example, FIG. 8 illustrates one implementation of a correlator 800 for a direct sequence spread spectrum signal, in accordance with an embodiment of the present invention. The correlator includes a mixing signal generator 806, matched filter 814, and local code generator 816. The mixing signal generator provides a mixing signal 808. The received signal stream 114 is mixed by mixer 804 with the mixing signal to produce a frequency shifted signal stream 812, frequency shifted by the carrier frequency offset hypothesis 810. The frequency shifted signal stream is provided to the matched filter. The local code generator generates a local code replica 818, with a code frequency offset hypothesis 820 and code phase hypothesis 822. The matched filter multiplies the frequency shifted signal stream by the local code replica using multiplier 824 and then sums the results using summer 826 to produce a correlation result 116.

Figure 9:
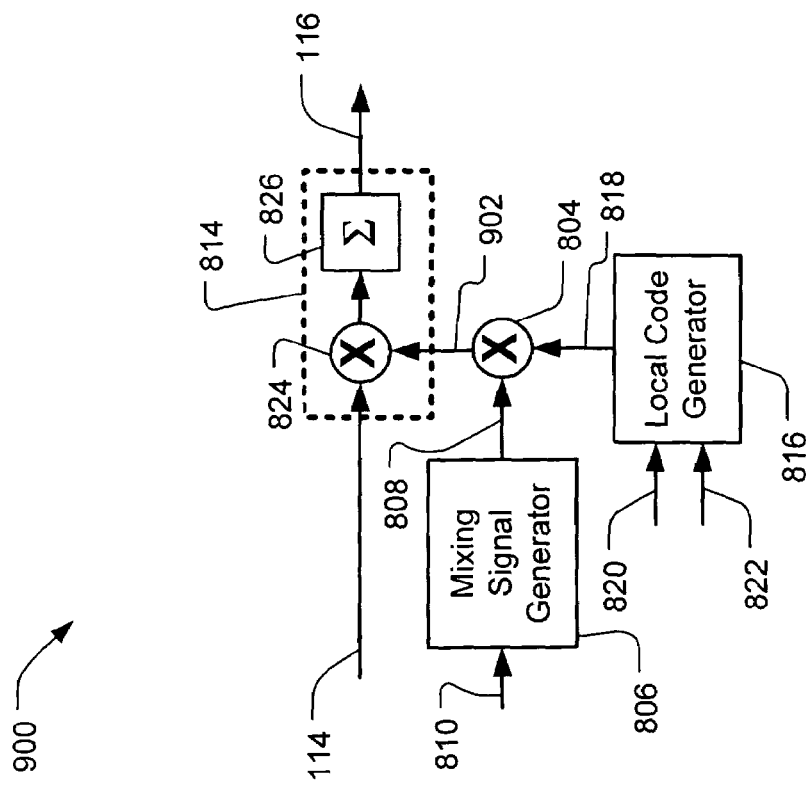
FIG. 9 is a block diagram of an alternate arrangement of a correlator in accordance with an embodiment of the present invention.

FIG. 9 illustrates an alternate arrangement of a correlator 900, in accordance with another embodiment of the present invention. The correlator 900 is an alternate arrangement of similar components wherein the local code replica is frequency shifted by the carrier frequency offset, rather than frequency shifting the received signal stream as just described. In particular, the local code replica 818, generated by the local code generator 816 with a code frequency offset hypothesis 820 and code phase hypothesis 822 is mixed in mixer 804 by the mixing signal 808. The resulting frequency shifted local code replica 902 is thus frequency shifted by the carrier frequency offset hypothesis 810. The frequency shifted local code replica is then provided to the matched filter 814 which produces the correlation result 116.

Various other embodiments of a correlator are also possible. In general, the correlator may be configured to generate the local code replica with a code frequency offset hypothesis and code phase hypothesis. One of either the local code replica or the received signal stream is frequency shifted by the carrier frequency hypothesis. The local code replica and received signal stream (one of them having been frequency shifted) are then provided to the matched filter to produce the correlation result. Various other embodiments of a correlator appropriate for use in the system will occur to one of skill in the art in possession of this disclosure.

Figure 10:
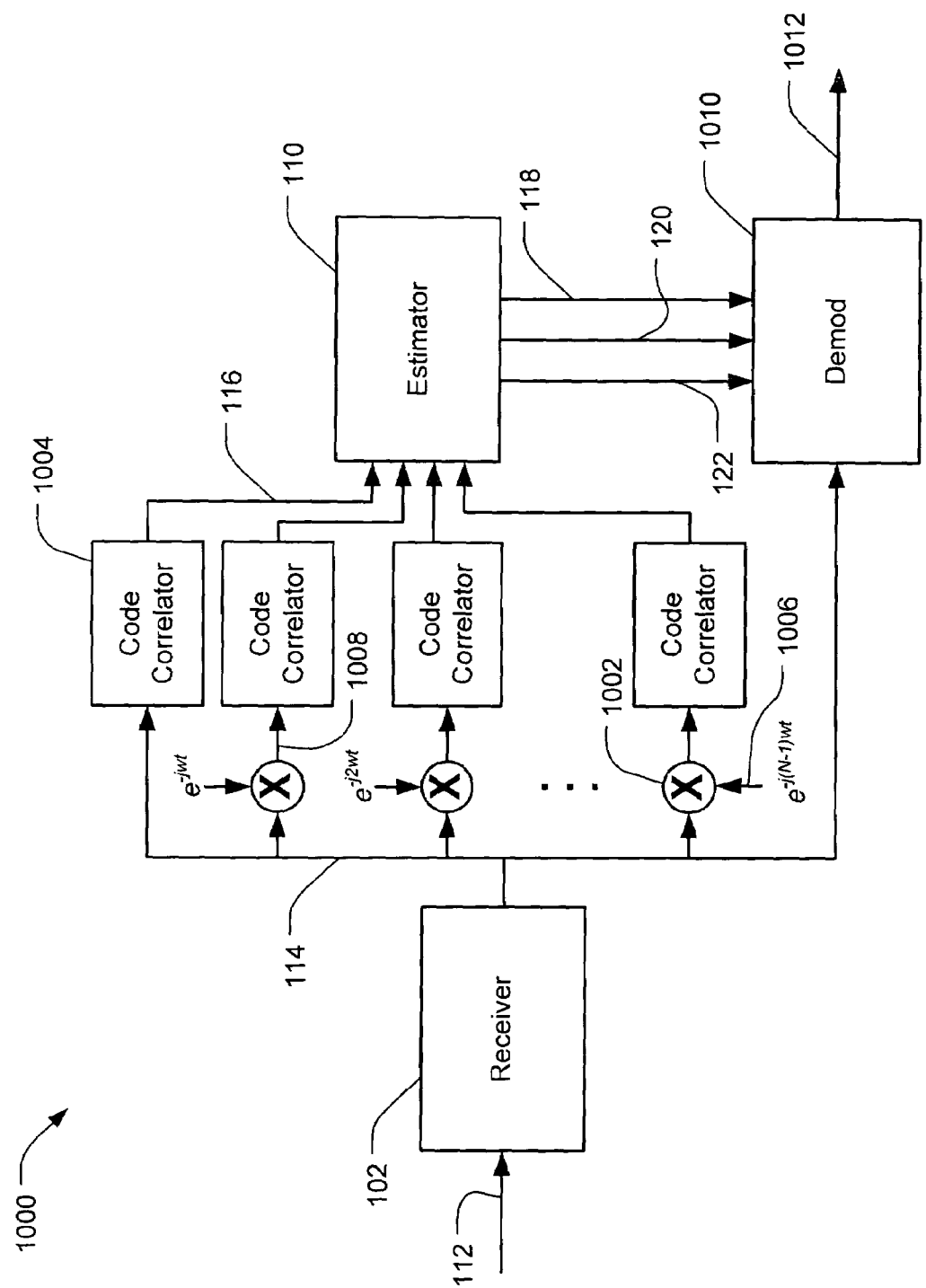
FIG. 10 is a block diagram of a system for detecting a spread spectrum encoded message within a received signal in accordance with another alternate embodiment of the present invention.

As illustrated in FIG. 10, a system, indicated generally at 1000, in accordance with another alternate embodiment of the present invention, is shown for detecting a spread spectrum encoded message within a received signal. The received signal 112 is accepted by a receiver 102, as described above, which produces a plurality of received signal streams 114 provided to a plurality of correlators. The plurality of correlators includes a plurality of mixers 1002 and code correlators 1004. Each signal stream is mixed by a mixing signal 1006 corresponding to a carrier frequency offset hypothesis to produce a frequency shifted signal stream 1008. For example, N frequency hypotheses evenly spaced by a frequency scan be generated using a Fast Fourier Transform.

Coupled to each mixer 1002 is at least one code correlator 1004. Each code correlator is configured to correlate the frequency shifted received signal stream 1008 with a local code replica having a code frequency offset hypothesis and a code phase hypothesis to produce a correlation result. For example, each code correlator may include a matched filter, such as a finite impulse response filter, where the taps of the filter are set equal to the pseudonoise code. Such a matched filter will thus function as a sliding correlator, providing a peak output whenever the code phase of the frequency shifted received signal stream is aligned with the local code replica. The correlation results 116 from the code correlators are provided to the estimator 110.

Figure 4:
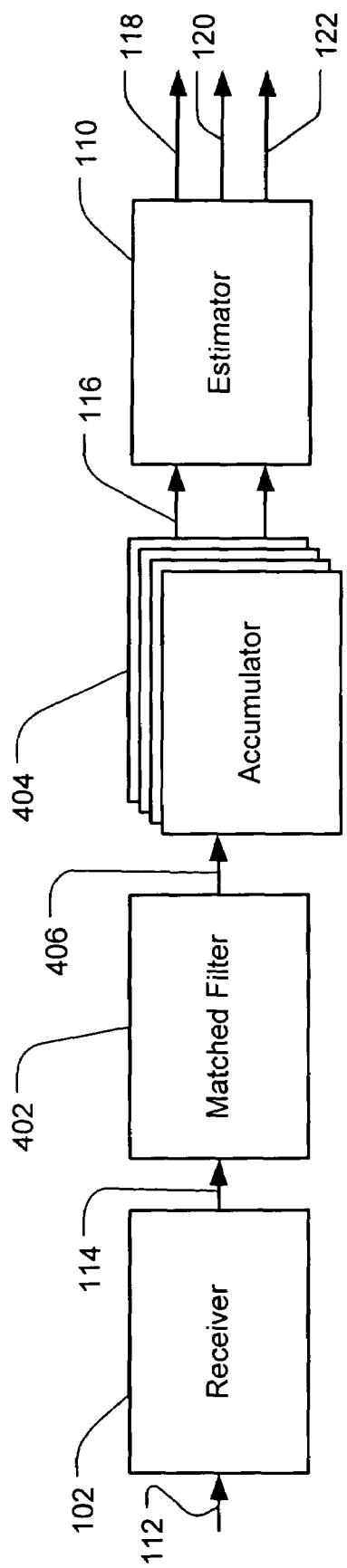
FIG. 4 is a block diagram of a system for detecting a spread spectrum encoded message in accordance with an alternate embodiment of the present invention.

Yet another alternate system 400 for detecting a spread spectrum encoded message within a received signal is shown in FIG. 4 in accordance with an embodiment of the present invention. The received signal 112 is accepted by a receiver 102, as described above, which produces a received signal stream 114 provided to a matched filter 402. The matched filter may be implemented, for example, using a finite impulse response filter with taps set equal to the pseudonoise code (or the conjugate of the spreading code, for a complex spreading code). The matched filter thus performs correlation of the received signal with the pseudonoise code over a one symbol interval. The matched filter outputs a new symbol sample 406 each sample time. For example, samples may be at approximately twice the rate of the pseudonoise code (i.e. two samples per chip of the pseudonoise code), in which case the matched filter outputs new symbol samples at twice the pseudonoise code rate. The symbol samples are then provided to a plurality of accumulators 404. The accumulators each accumulate a subset of symbol samples corresponding to a particular code phase, code frequency offset, and carrier frequency offset hypothesis. For example, the accumulators may be implemented by summing every $M^{th}$ sample, where M corresponds to the number of samples in one symbol time. Each accumulator may also include a mixer configured to phase rotate the symbol samples corresponding to the carrier frequency offset hypothesis. The accumulators output a plurality of correlation results 116 which are provided to the estimator 110.

Figure 5:
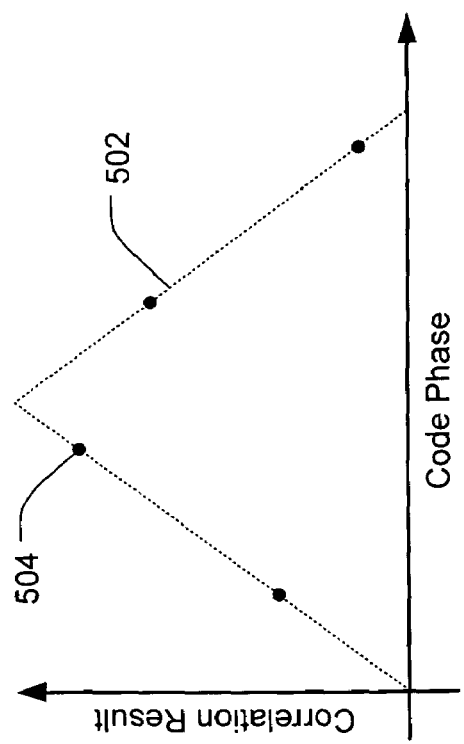
FIG. 5 is a graph of an exemplary autocorrelation as a function of code phase.

A means for estimating the unknown code phase, unknown code frequency offset, and unknown carrier frequency offset may be implemented in a variety of ways. In accordance with one embodiment of the present invention, the means for estimating may be implemented with an estimator 110 configured to estimate the unknown code phase, unknown code frequency offset, and unknown carrier frequency offset using one or more of the correlation results 116. For example the estimator may estimate the unknown code phase by interpolating multiple correlation results corresponding to different code phase hypotheses. This interpolation may also take into account the autocorrelation function for the pseudonoise code. Theoretically, the autocorrelation function for the pseudonoise code varies as a linear triangle function of the difference between the unknown code phase and code phase hypothesis, peaking when the two are aligned. Depending on the particular pseudonoise code used, and details of the pulse shaping within the spread spectrum transmitter and receiver, the autocorrelation function may deviate from a linear function. FIG. 5 illustrates an exemplary autocorrelation function 502 as a function of code phase. Several correlation results 504 are shown which correspond to different code phase hypotheses. Sometimes, as illustrated in FIG. 5, the maximum correlation result will not correspond to the unknown code phase, for example when the unknown code phase is between two code phase hypotheses. In such a case, the maximum code phase can be determined by interpolating between two, three, or more of the correlation results. For example, linear interpolation may be performed using the maximum correlation result and two adjacent correlation results corresponding to different code phase hypotheses, where all three correlation results correspond to a common carrier frequency offset hypothesis and common code frequency hypothesis.

Figure 6:
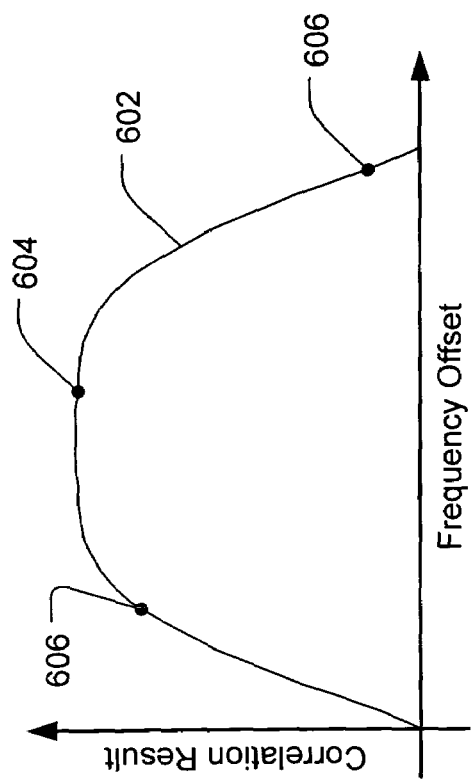
FIG. 6 is a graph of an exemplary autocorrelation as a function of carrier frequency offset.

Similarly, the estimator may estimate the unknown code frequency and unknown carrier frequency by interpolation. Theoretically, the cross correlation function of two replicas of a pseudonoise code with a code frequency offset between them is also linear, and hence linear interpolation may be performed as discussed above. Theoretically, the cross correlation function 602 of two replicas of a pseudonoise code with a carrier frequency offset between them is a sinc or sinc-squared function, e.g. as illustrated in FIG. 6. In practice, the actual correlation results will also be affected by the receiver characteristics, for example the bandwidth and shape factor of filters in the receiver. Various interpolation functions can be used, including for example performing quadratic interpolation. For example, three point quadratic interpolation using the maximum correlation result 604 and two adjacent correlation results 606 corresponding to different carrier frequency offsets may be performed. By performing interpolation, better accuracy in the estimated signal parameters can be obtained than using the signal parameters corresponding to the maximum correlation result.

Figure 12:
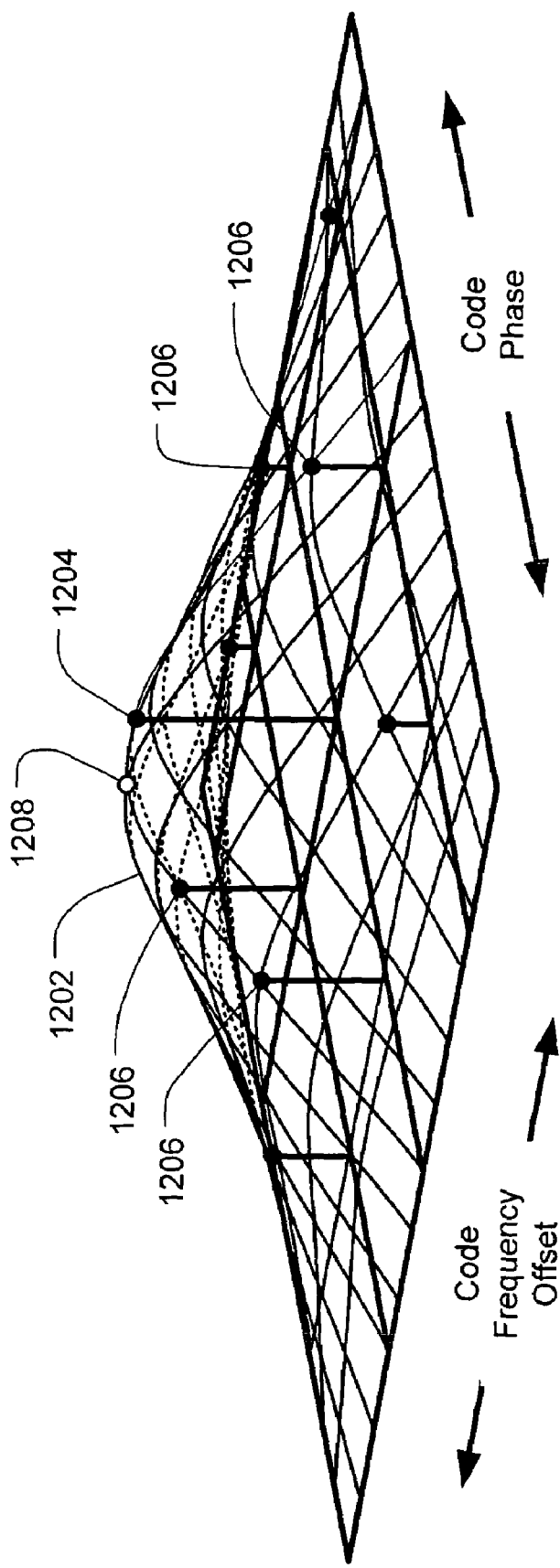
FIG. 12 is an exemplary graph of the magnitude of the correlation results taken in a two-dimensional slice.

As just described, one-dimensional interpolation of each individual signal parameter may be performed separately. Alternately, multi-dimensional interpolation may be performed to simultaneously estimate two or all three of the signal parameters. FIG. 12 provides an exemplary graph of the magnitude of the correlation results taken in a two-dimensional slice, where the code phase hypothesis and code offset frequency hypotheses are varied. A number of correlation results 1204, 1206 are plotted. The surface 1202 represents the theoretical value of the correlation function. Each of the correlation results represents a sample of the correlation function at a particular code phase hypothesis and code frequency hypothesis. Two-dimensional interpolation may thus be performed to estimate the maximum 1208 of this surface. For example, this interpolation may be performed by taking the largest correlation result 1204 and the four surrounding correlation results 1206. By performing two-dimensional interpolation, improved accuracy may be obtained over performing two separate one-dimensional interpolations. Similarly, three-dimensional interpolation may also be performed to simultaneously estimating all of the signal parameters.

Referring to FIG. 10, an additional advantage of the system is enhanced performance of the demodulator 1010 which extracts the message 1012 from the signal 112. For example, as noted above, it is desirable for the demodulator to achieve accurate timing synchronization to the pseudonoise code. This may be accomplished, for example, by using a portion of message preamble to allow the demodulator to perform fine synchronization, e.g. with a phase locked loop. By providing estimates of the unknown code phase 118, code frequency error 120, and carrier frequency offset 122 to the demodulator 1010, this fine synchronization time can be reduced, improving overall communications efficiency. Alternately, it may be possible to use the estimated signal parameters directly in the demodulator without performing any fine synchronization. By interpolating the correlation results to provide improved accuracy estimates of the signal parameters, reduced error rates may be achieved in the demodulator.

Figure 11:
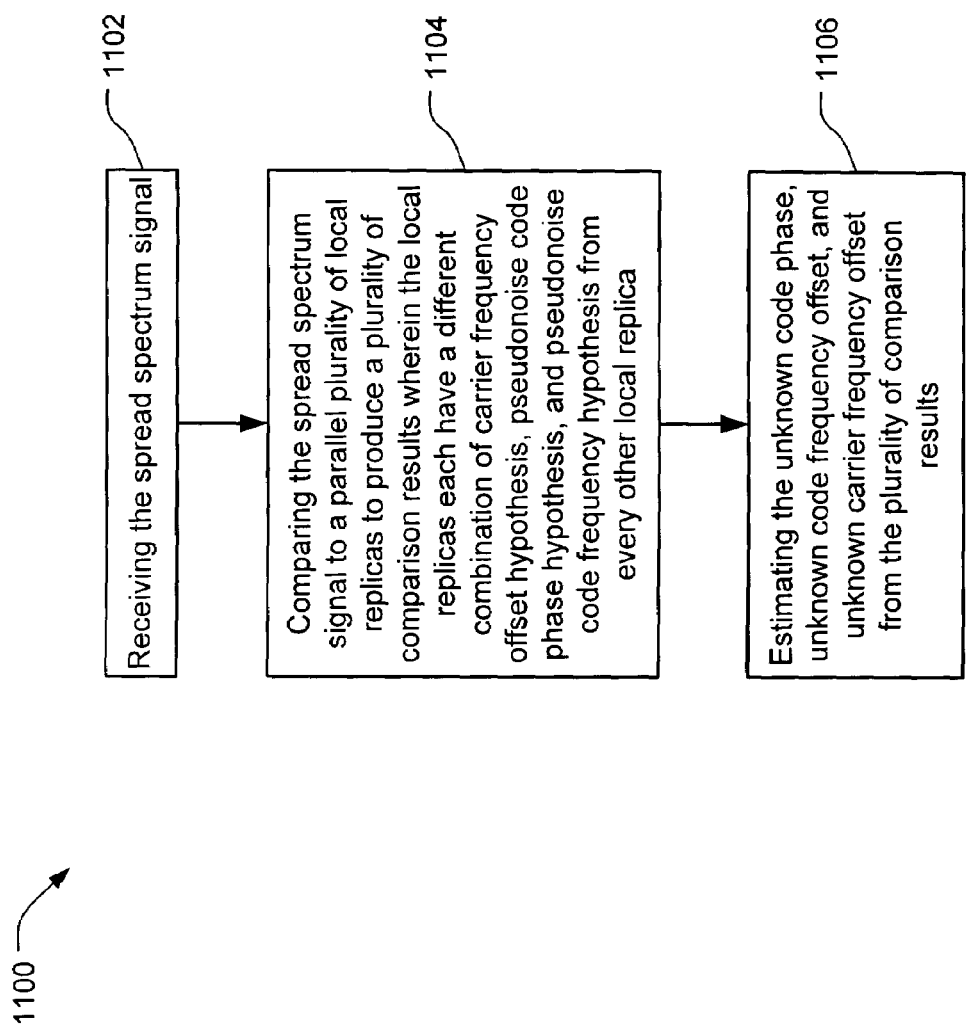
FIG. 11 is a flow chart of a method for detecting a spread spectrum encoded message within a received signal in accordance with an embodiment of the present invention.

Finally, a method for detecting a spread spectrum encoded message within a received signal is illustrated in flow chart form in FIG. 11 in accordance with another embodiment of the present invention. The method 1100 may include receiving 1102 the spread spectrum signal. For example, receiving the signal may include collecting a wireless signal with an antenna, downconverting, amplifying, digitizing, and sampling as is known in the art. The method may further include comparing 1104 the spread spectrum signal to a parallel plurality of local replicas to produce a plurality of comparison results wherein the local replicas each have a different combination of carrier frequency offset hypothesis, pseudonoise code phase hypothesis, and pseudonoise code frequency hypothesis from every other local replica. For example, comparing may be performed by correlating the spread spectrum signal to a parallel plurality of local replicas. The method may further include estimating 1106 the unknown code phase, unknown code frequency offset, and unknown carrier frequency offset from the plurality of comparison results. For example estimating may be performed by finding a maximum correlation result and interpolating between the maximum correlation result and adjacent correlation results to estimate the unknown code phase, unknown code frequency offset, and unknown carrier frequency offset. The interpolating may, for example, be performed by linear or quadratic interpolation, in one two or three dimensions as discussed above.

The various embodiments of the invention described above may be implemented in a variety of ways. For example, the received signal may be converted into a sampled and digitized signal and digitally signal processed using an application specific integrated circuit, custom or field programmable gate array, or software. Alternately, discrete components may be used to perform the signal processing using either analog or digital techniques. Various different implementations of the teachings disclosed above will occur to one of skill in the art in possession of this disclosure.

Summarizing, and reiterating to some extent, a technique for detecting a spread spectrum encoded message has been invented. The technique includes searching, in parallel, for the spread spectrum encoded message with a plurality of different code phase, code frequency offset, and carrier frequency offset hypotheses. The unknown code phase, code frequency offset, and carrier frequency offset of the spread spectrum encoded message can then be estimated, for example, using interpolation. Using the technique, faster acquisition performance can be obtained, shorter preambles can be used, and multiple overlapping spread ALOHA transmissions can be detected.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A system for detecting a spread spectrum encoded message within a received signal wherein the spread spectrum encoded message has been encoded with a predetermined pseudonoise code, the spread spectrum encoded message having an unknown code phase, unknown code frequency offset, and unknown carrier frequency offset, the system comprising:

a receiver configured to accept the received signal and output a plurality of received signal streams;

a first searcher coupled to the receiver and configured to accept at least one of the plurality of received signal streams and search a plurality of code phase hypotheses for the spread spectrum encoded message;

a second searcher coupled to the receiver and configured to accept at least one of the plurality of received signal streams and search a plurality of code frequency offset hypotheses for the spread spectrum encoded message;

a third searcher coupled to the receiver and configured to accept at least one of the plurality of received signal streams and search a plurality of carrier frequency offset hypotheses for the spread spectrum encoded message, wherein the first searcher, second searcher, and third searcher are configured to search in parallel the plurality of code phase, code frequency offset, and carrier frequency offset hypotheses to produce a plurality of correlation results, wherein the plurality of code frequency offset hypotheses is independent from the plurality of carrier frequency offset hypotheses; and an estimator, coupled to the first searcher, second searcher, and third searcher, and configured to accept the plurality of correlation results and estimate the unknown code phase, unknown code frequency offset, and unknown carrier frequency offset.

2. The system of claim 1 wherein each of the first searcher, second searcher, and third searcher are configured to search for the spread spectrum encoded message by correlating the at least one of the plurality of received signal streams with a local code replica, wherein the local code replica corresponds to a particular code phase hypothesis, code frequency offset hypothesis and carrier frequency offset hypothesis.

3. The system of claim 1 wherein each of the correlation results corresponds to a unique code phase hypothesis, code frequency offset hypothesis and carrier frequency offset hypothesis.

4. The system of claim 1 wherein the estimator is further configured to declare detection of the spread spectrum encoded message when at least one of the correlation results exceeds a predetermined threshold.

5. The system of claim 1 wherein the estimator is further configured to declare detection of the spread spectrum encoded message when at least one of the correlation results exceeds a predetermined multiple of an estimated noise floor.

6. The system of claim 1 wherein the estimator is further configured to estimate the unknown code phase, unknown code frequency offset, and unknown carrier frequency offset by using the code phase hypothesis, code frequency offset hypothesis, and carrier frequency hypothesis corresponding to a largest of the correlation results.

7. The system of claim 1 wherein the estimator is further configured to estimate the unknown code phase, unknown code frequency offset, and unknown carrier frequency offset by interpolating between multiple correlation results.

8. The system of claim 1 further comprising a demodulator coupled to the receiver and configured to accept one of the plurality of received signal streams and estimate the spread spectrum encoded message.

9. A system for detecting a spread spectrum encoded message within a received signal wherein the spread spectrum encoded message has been encoded with a predetermined pseudonoise code having an unknown code phase and unknown code frequency offset and the spread spectrum encoded message has an unknown carrier frequency offset, the system comprising:

a receiver configured to accept the received signal and output a received signal stream;

a plurality of correlators coupled to the receiver, each correlator configured to accept the received signal stream and correlate the received signal stream with a local code replica to produce a correlation result, wherein at least one of a carrier frequency offset hypothesis, code frequency hypothesis, and code phase hypothesis used by the correlator is different than every other correlator so that the plurality of correlators search a three-dimensional region of unknown code phase, unknown code frequency offset, and unknown carrier frequency offset and an estimator coupled to the plurality of correlators and configured to accept the plurality of correlation results, and estimate the unknown carrier frequency offset, unknown code frequency offset, and unknown code phase to produce estimated signal parameters.

10. The system of claim 9 wherein each of the plurality of correlators is further configured to frequency shift the received signal stream by the carrier frequency offset hypothesis.

11. The system of claim 9 wherein each of the plurality of correlators is further configured to frequency shift the local code replica by the carrier frequency offset hypothesis.

12. The system of claim 9 wherein the unknown code phase and unknown code frequency offset are independent of each other.

13. The system of claim 9 wherein each of the plurality of correlators is further configured to generate the local code replica with a code frequency offset hypothesis and code phase hypothesis.

14. The system of claim 9 wherein the received signal stream is frequency shifted by a carrier frequency offset hypothesis, the local code replica is generated with a code frequency offset hypothesis and code phase hypothesis.

15. The system of claim 9 wherein each correlator comprises a local code generator configured to generate the local code replica.

16. The system of claim 9 wherein each correlator comprises:
a mixer, configured to multiply the received signal stream by a mixing signal to produce a frequency shifted received signal stream, frequency shifted by the carrier frequency hypothesis; and
a matched filter, coupled to the mixer, configured to correlate the frequency shifted received signal stream with the local code replica to produce the correlation result.

17. The system of claim 9 wherein each correlator comprises:
a mixer, configured to multiply the local code replica by a mixing signal to produce a frequency shifted local code replica, frequency shifted by the carrier frequency hypothesis; and
a matched filter, coupled to the mixer, configured to correlate the frequency shifted local code replica with the received signal stream to produce the correlation result.

18. The system of claim 9 wherein the plurality of correlators comprises:
a plurality of mixers, each mixer coupled to the receiver and configured to frequency shift the received signal stream by a carrier frequency offset hypothesis to produce a frequency shifted received signal stream; and
a plurality of code correlators, at least one of the plurality of code correlators coupled to each mixer, each of the plurality of code correlators configured to accept the frequency shifted received signal stream and correlate the frequency shifted received signal stream with a local code replica having a code frequency offset hypothesis and a code phase hypothesis to produce a correlation result.

19. The system of claim 9 wherein the plurality of correlators comprises:
a matched filter, coupled to the receiver and configured to correlate the received signal stream with the predetermined pseudonoise code to produce a stream of symbol samples; and
a plurality of accumulators coupled to the matched filter, each accumulator configured to accumulate a plurality of symbol samples selected from the stream of symbol samples corresponding to a code phase hypothesis and a code frequency hypothesis to produce a correlation result.

20. The system of claim 19 wherein the plurality of correlators further comprises a plurality of mixers each configured to phase rotate the symbol samples corresponding to a carrier frequency offset hypothesis.

21. The system of claim 9 wherein the estimator is further configured to declare detection of the spread spectrum encoded message when at least one of the correlation results exceeds a predetermined threshold.

22. The system of claim 9 wherein the estimator is further configured to declare detection of the spread spectrum encoded message when at least one of the correlation results exceeds a predetermined multiple of an estimated noise floor.

23. The system of claim 9 wherein the estimator is further configured to estimate the signal parameters by using the code phase hypothesis, code frequency offset hypothesis, and carrier frequency hypothesis corresponding to the largest correlation result.

24. The system of claim 9 wherein the estimator is further configured to estimate the signal parameters by interpolating between multiple correlation results.

25. The system of claim 24 wherein the estimator is further configured to estimate the unknown code phase by linear interpolation using a maximum correlation result and two adjacent correlation results corresponding to different code phase hypotheses, where all three correlation results correspond to a common carrier frequency offset hypothesis and common code frequency hypothesis.

26. The system of claim 24 wherein the estimator is further configured to estimate the unknown code frequency offset by linear interpolation using a maximum correlation result and two adjacent correlation results corresponding to different code frequency offset hypotheses, where all three correlation results correspond to a common carrier frequency offset hypothesis and common code phase hypothesis.

27. The system of claim 24 wherein the estimator is further configured to estimate the unknown carrier frequency offset by quadratic interpolation using a maximum correlation result and two adjacent correlation results corresponding to different carrier frequency offset hypotheses, where all three correlation results correspond to a common code frequency offset hypothesis and common code phase hypothesis.

28. The system of claim 24 wherein the estimator is further configured to estimate the signal parameters by performing a two-dimensional interpolation.

29. The system of claim 24 wherein the estimator is further configured to estimate the signal parameters by performing a three-dimensional interpolation.

30. The system of claim 9 further comprising a demodulator coupled to the receiver and configured to accept one of the plurality of received signal streams and extract the spread spectrum encoded message.

31. The system of claim 30 wherein the demodulator is further coupled to the estimator and configured to accept and use the estimated signal parameters to extract the spread spectrum encoded message.

32. A system for detecting a spread spectrum encoded message within a received signal wherein the spread spectrum encoded message has been encoded with a predetermined pseudonoise code, the spread spectrum encoded message having an unknown code phase, unknown code frequency offset, and unknown carrier frequency offset, the system comprising:
means for receiving the received signal and outputting at least one received signal stream;
means for parallel correlating the at least one received signal stream with a plurality of code phase, code frequency offset, and carrier frequency offset hypotheses to produce a plurality of correlation results wherein the plurality of code frequency offset hypotheses is independent from the plurality of carrier frequency offset hypotheses; and means for estimating the unknown code phase, unknown code frequency offset, and unknown carrier frequency offset from at least one of the plurality of correlation results.

33. A method for detecting a spread spectrum encoded message within a received signal wherein the spread spectrum encoded message has been encoded with a predetermined pseudonoise code having an unknown code phase and unknown code frequency offset and the spread spectrum encoded message has an unknown carrier frequency offset, the method comprising:
  receiving the spread spectrum signal with a receiver;
  comparing the spread spectrum signal to a parallel plurality of local replicas using a correlator to produce a plurality of comparison results wherein the local replicas each have a different combination of carrier frequency offset hypothesis, pseudonoise code phase hypothesis, and pseudonoise code frequency hypothesis from every other local replica so that a three-dimensional region of unknown code phase, unknown code frequency offset, and unknown carrier frequency offset is searched; and
  estimating the unknown code phase, unknown code frequency offset, and unknown carrier frequency offset from the plurality of comparison results using an estimator.

34. The method of claim 33 wherein comparing the spread spectrum signal to a parallel plurality of local replicas further comprises correlating the spread spectrum signal with each of the plurality of local replicas.

35. The method of claim 33 wherein estimating the unknown code phase, unknown code frequency offset, and unknown carrier frequency offset further comprises:
  finding a maximum correlation result; and
  interpolating between the maximum correlation result and adjacent correlation results to estimate the unknown code phase, unknown code frequency offset, and unknown carrier frequency offset.

36. The method of claim 35 wherein interpolating between the maximum correlation result and adjacent correlation results further comprises interpolating linearly.

37. The method of claim 35 wherein interpolating between the maximum correlation result and adjacent correlation results further comprises interpolating quadratically.

38. The method of claim 33 wherein estimating the unknown code phase, unknown code frequency offset, and unknown carrier frequency offset comprises multidimensional interpolating a subset of the plurality of correlation results.

39. The system of claim 1, wherein each of first searcher, the second searcher, and the third searcher produce the plurality of correlation results by performing a coherent integration.

40. The system of claim 9, wherein each of the plurality of correlators produces the correlation result by performing a coherent integration.

41. The system of claim 32, wherein the leans for parallel correlating comprises means for coherently integrating to produce the plurality correlation results.

42. The method of claim 33, wherein the comparing the spread spectrum signal comprises using a coherent integration to produce the plurality of comparison results.

* * * * *

UNITED STATES PATENT AND TRADEMARK OFFICE
CERTIFICATE OF CORRECTION

| | |
|---|---|
| PATENT NO. | : 7,634,033 B1 |
| APPLICATION NO. | : 11/351464 |
| DATED | : December 15, 2009 |
| INVENTOR(S) | : Giallorenzi et al. |

It is certified that error appears in the above-identified patent and that said Letters Patent is hereby corrected as shown below:

In the drawings, Sheet 5, FIG. 7, the reference numeral 700 should be applied to the system.

Signed and Sealed this

Twenty-seventh Day of April, 2010

David J. Kappos
*Director of the United States Patent and Trademark Office*